United States Patent [19]

Read

[11] 3,960,392

[45] June 1, 1976

[54] CHILDREN'S RUNABOUT

[75] Inventor: Donald E. Read, Milwaukee, Wis.

[73] Assignee: Garton Company, Sheboygan, Wis.

[22] Filed: Feb. 3, 1975

[21] Appl. No.: 546,205

[52] U.S. Cl............................ 280/282; 280/1.11 R; 280/287
[51] Int. Cl.²......................................... B62K 9/02
[58] Field of Search......... 280/1.11 R, 1.1 R, 87.01, 280/267, 34 R, 287, 282; 180/25 R, 25 A

[56] References Cited
UNITED STATES PATENTS

| | | | |
|---|---|---|---|
| 2,565,848 | 8/1951 | Howard | 280/34 X |
| 2,919,139 | 12/1959 | Rupp | 280/1.11 R |
| 2,986,406 | 5/1961 | Kahl | 280/253 |
| 2,993,709 | 7/1961 | Wick | 280/287 |
| 3,669,468 | 6/1972 | Rich | 280/267 |

FOREIGN PATENTS OR APPLICATIONS

| | | | |
|---|---|---|---|
| 239,664 | 12/1959 | Australia | 280/1.11 R |

*Primary Examiner*—Philip Goodman
*Assistant Examiner*—R. Schrecengost
*Attorney, Agent, or Firm*—Quarles & Brady

[57] ABSTRACT

A wheeled vehicle for children has an open-centered frame that is dimensionally adjustable longitudinally on which a front drive axle and a rear wheel yoke are mounted. An operator's seat having cushion and back portions is secured within the interior and towards the rear of the open-centered frame and the cushion portion is disposed at an elevation substantially equal to the axle height of the vehicle wheel base. The front drive axle has a front drive wheel rotatably mounted on each end, and a pedal portion between the two front drive wheels which propels the vehicle when actuated by the vehicle operator. A steering lever is pivotally mounted on the exterior of each side of the open-centered frame adjacent the operator's seat and is connected to the rear wheel yoke by a steering rod. A rear steering wheel is mounted by the rear wheel yoke and tilting of the steering levers pivots the rear wheel yoke, and, hence, the rear steering wheel about an upright axis imparting a steering motion to the vehicle.

5 Claims, 5 Drawing Figures

CHILDREN'S RUNABOUT

BACKGROUND OF THE INVENTION

This invention relates to a wheeled vehicle, and, more particularly, to a wheeled runabout for children.

Two-wheeled bicycle-type children's vehicles and three-wheeled tricycle-type children's vehicles are well known in the prior art. The bicycle-type vehicles are not particularly suitable for operation by small children because such children typically have not acquired the degree of coordination necessary to adequately balance them. The tricycle-type vehicles are typically unsatisfactory, however, because they commonly have a design in which the operator's seat is positioned at a high elevation. Thus, the center of gravity of the operator and vehicle is high relative to the vehicle wheel base. This can lead to vehicle instability, with the user experiencing a tottering sensation. There is also the likelihood that the vehicle may tilt, particularly while the user is negotiating a turn, so that he is thrown from the vehicle, and older styles of tricycles have been criticized for this propensity to tip.

Alternative tricycle-type vehicles having a low center of gravity have been designed. However, such alternative vehicles still have the conventional design in which the vehicle frame does not surround both the operator's seat and the drive means. Thus, a small child is not secure while operating such a vehicle, since no restraining means are commonly provided. Also, there is no protective framing to provide shielding for the operator when collisions with other objects occur.

The prior art is also deficient in not providing a children's wheeled vehicle which is readily adjustable to accommodate the size of the user. Thus, either one average-sized vehicle of a particular structure and design is available to all users or a plurality of such vehicles of different size and dimensions must be manufactured.

SUMMARY OF THE INVENTION

The present invention contemplates a wheeled vehicle having a front wheel drive with rear wheel steering, and it, more specifically, resides in a vehicle having an open-centered frame, a front drive axle with spaced apart front wheels, a rear wheel castor mounting a pivoted rear wheel, an operator's seat disposed within the interior of and surrounded by the open-centered frame, and steering levers mounted at the sides of the operator's seat which are connected to the rear wheel castor for turning the rear wheel in response to manual actuation of the steering levers.

It is a general object of the invention to provide a children's wheeled vehicle that has a high degree of roadability and is stable in operation. The vehicle is constructed so that the center of gravity of the operator and vehicle is low relative to the vehicle wheel base. This construction diminishes the tottering sensation commonly experienced by users of conventional tricycle-type vehicles and the likelihood of tilting.

It is another general object of the invention to provide a children's wheeled vehicle which is safe, particularly for operation by small children. The vehicle has an open-centered frame which forms a vehicle perimeter that completely surrounds the operator's seat and the drive means. The open-centered frame thus provides a construction which protects the operator and can restrain falling from the vehicle, especially during sharp turning movements or when the vehicle might collide with other objects.

A further object of the invention is to provide a children's vehicle having a construction which is easily adapted to users of varying size. The open-centered frame has a front section which is telescopically received by a rear section, so that the length of the open-centered frame is adjustable. Furthermore, the front drive axle is adjustably mounted on the front of the open-centered frame, and may be mounted at various positions along the frame to alter the distance between the operator's seat and the drive means.

It is a still further object of the invention to provide a children's wheeled vehicle having a steering mechanism that is easy to manipulate. A steering lever is pivotally mounted on the exterior of each side of the open-centered frame, and a tilting motion of the steering levers results in fore and aft movement of a pair of steering rods thus turning a rear steering wheel. The steering levers are positioned so that the vehicle operator can easily grasp one steering lever in each hand while sitting in the operator's seat.

It is a still further object of the invention to provide a vehicle that is fun to ride and has an appearance that is attractive to children and adults alike.

It is yet another object of the invention to provide a vehicle which is durable, safe, and easy to operate, but is also relatively inexpensive and easy to manufacture, assemble, maintain, and use.

The foregoing and other objects and advantages of the invention will appear from the following description. In the description, reference is made to the accompanying drawings which form a part hereof, and in which there is shown by way of illustration and not of limitation a preferred embodiment of the invention. Such embodiment does not represent the full scope of the invention, but rather the invention may be employed in many different embodiments, and reference is made to the claims herein for interpreting the breadth of the invention.

DESCRIPTION OF PREFERRED EMBODIMENT

Figure 1:
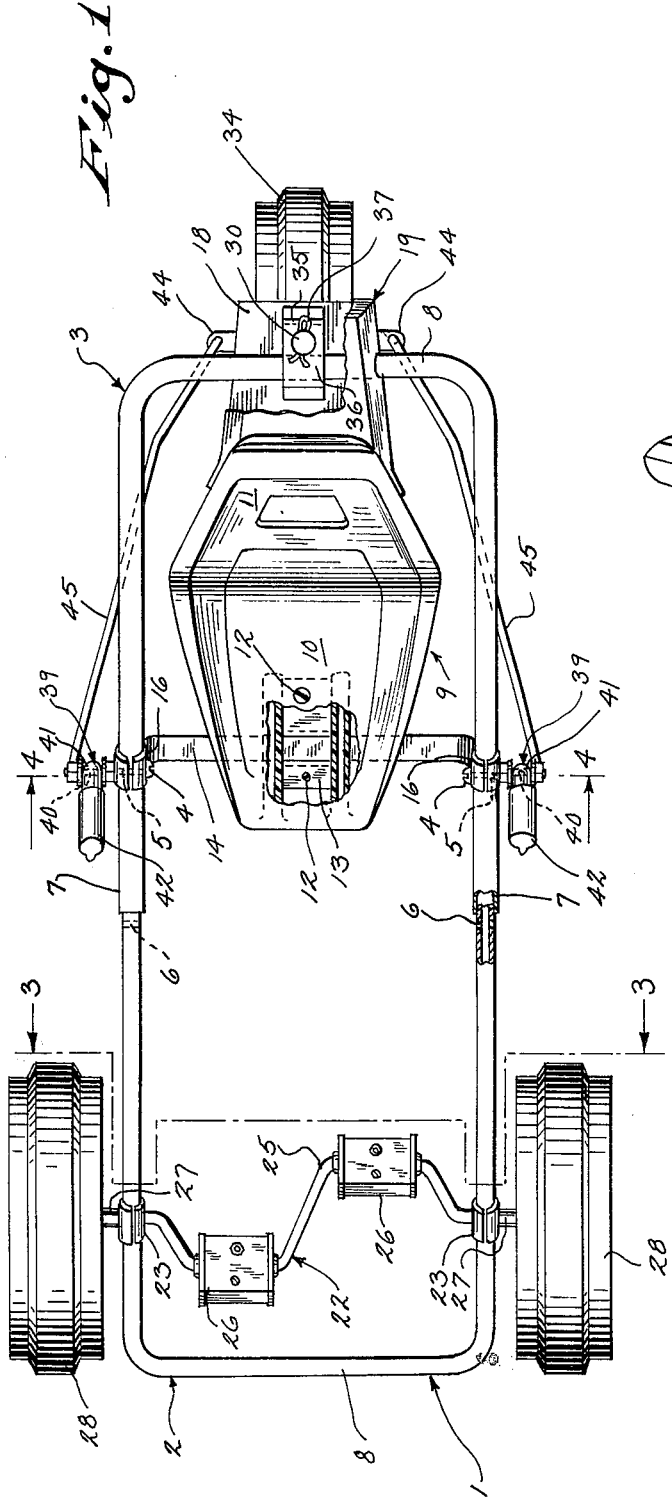
FIG. 1 is a top view with parts cut away of a wheeled vehicle which incorporates the present invention.
Figure 2:
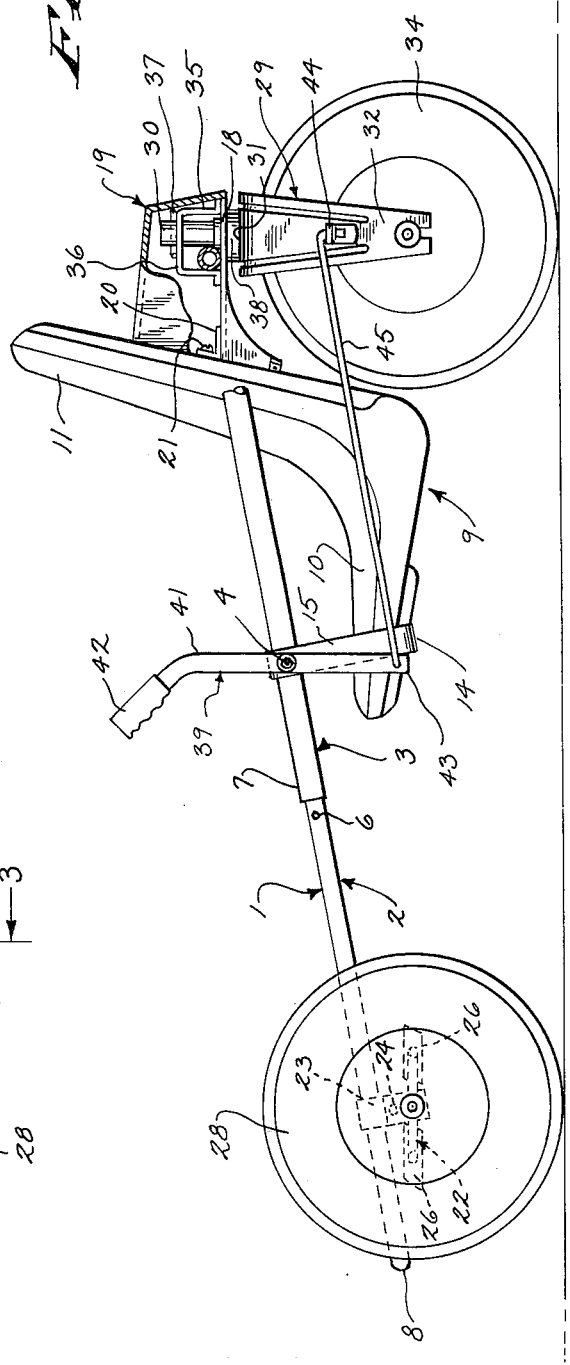
FIG. 2 is a side view with parts cut away of the wheeled vehicle of FIG. 1.

Referring particularly to FIGS. 1 and 2, the wheeled vehicle shown includes a metal, tubular, open-centered frame 1 formed from a pair of U-shaped front and rear sections 2 and 3, respectively. The legs of the U-shaped front section 2 are telescopically received in the legs of the U-shaped rear section 3, and are fastened thereto on each side of the vehicle by a frame securing bolt 4. Each leg of the rear frame section 3 has a single bolt receiving aperture 5, while each leg of the front frame section 2 is provided with a plurality of longitudinally spaced bolt receiving apertures 6. The open-centered frame 1 is thus assembled to a desired length by sliding the front frame section 2 into the rear frame section 3 until the appropriate apertures 6 are aligned with the apertures 5, and then passing the bolts 4 through the openings 5, 6.

When the front frame section 2 is fastened to the rear frame section 3, the open-centered frame 1 has a pair of spaced longitudinal side members 7 that slope downwardly from the rear towards the front of the vehicle. The center bights of the U-shaped frame sections 2, 3 form a pair of front and rear transverse members 8 that extend between the longitudinal side members 7, and in combination therewith form a wrap-around frame that constitutes a vehicle perimeter.

The open interior of the wrap-around frame 1 presents a cockpit area, and disposed within this area towards the rear is an operator's seat 9 consisting of a cushion portion 10 and a back portion 11. As shown in FIG. 2, the upper body of an occupant of the operator's seat will assume a substantially upright position in operating the vehicle, which is a normal posture simulating that of a low center of gravity sports car. The cushion portion 10 is formed of a plastic material and is generally slightly inclined from the horizontal plane of the ground surface towards the front of the vehicle, while the back portion 11 is also formed of a plastic material integrally with the cushion portion 10 and is generally slightly inclined from a vertical plane towards the rear of the vehicle. The cushion portion 10 is located at an elevation which is beneath sloping longitudinal side members 7, and substantially at a height equivalent to axle height, well beneath the wheel tops. The back portion 11 rises above the longitudinal side members 7 to properly support the upper body and to give the user a feel of sitting within and extending above a protective cockpit.

Figure 4:
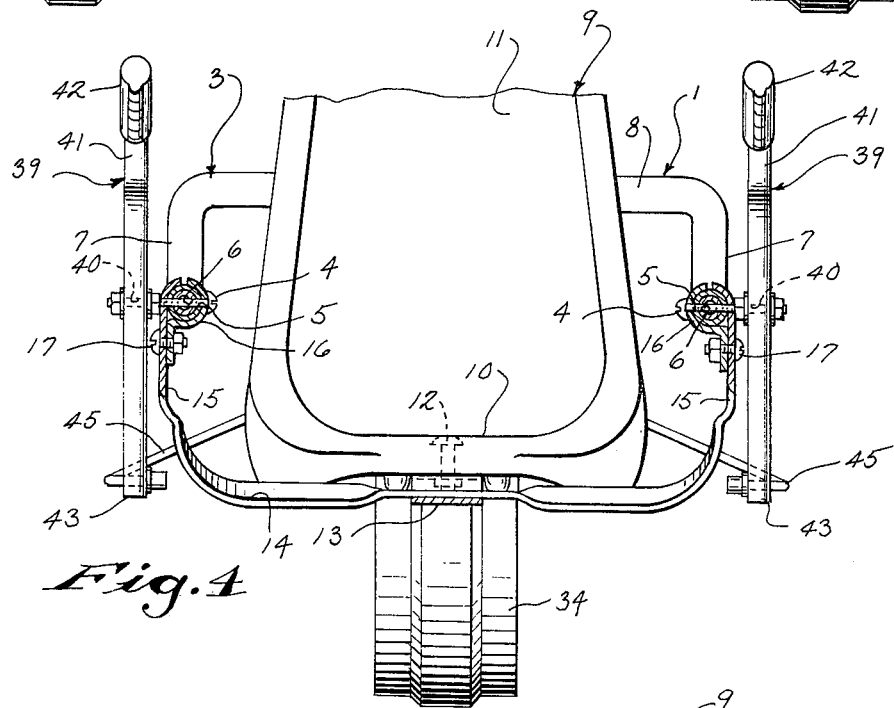
FIG. 4 is a view in cross-section taken along the plane of the line 4—4 shown in FIG. 1.

Referring to FIGS. 1 and 4, the underside of the cushion portion 10 is fastened by a pair of bolts 12 and a rectangularly shaped support plate 13 to the center of a transversely extending seat mounting strap 14. As seen in FIG. 4, the strap 14 has laterally spaced uprights 15 which have inwardly curved upper ends that fit partially around the longitudinal side members 7. A curved clamp 16 is fastened at its lower end to the inner side of each upright 15 by a bolt 17, and is outwardly curved at its upper end to wrap partially around the associated longitudinal side member 7 at a point opposite the upper end of the upright 15. Apertures are formed in the upper ends of both uprights 15 and both clamps 16 to receive the frame securing bolts 4, so that the frame securing bolts 4, in addition to fastening the front and rear frame sections 2 and 3 respectively together also serve to secure the seat mounting strap 14 to the open-centered frame 1.

Figure 5:
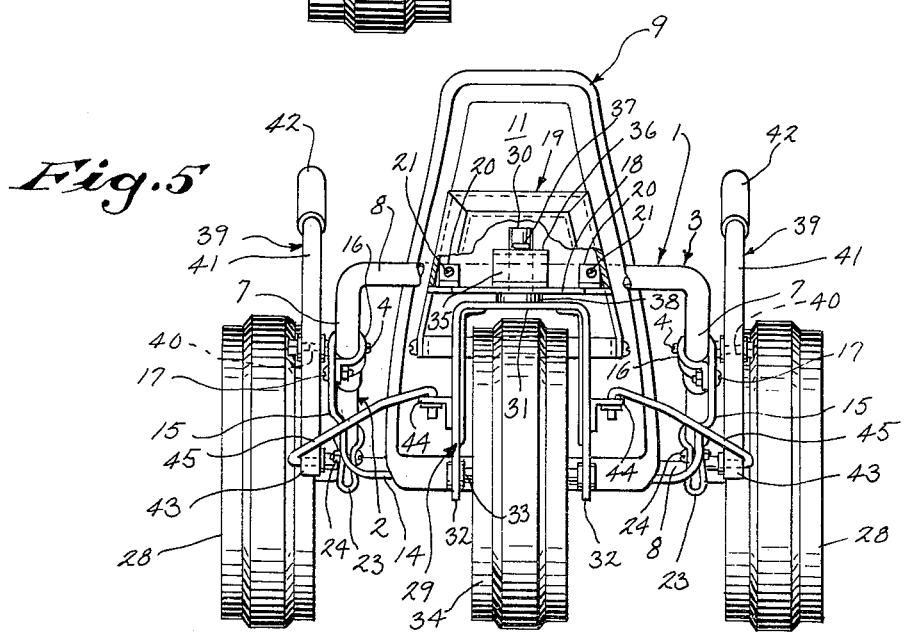
FIG. 5 is a rear view with parts cut away of the wheeled vehicle of FIG. 1.

Referring now to FIGS. 2 and 5, the rear of the seat back portion 11 is fastened to a horizontal mounting plate 18 covered by a box-like shroud 19. The mounting plate 18 is welded to the underside of the rear transverse frame member 8. A pair of laterally spaced L-shaped seat support brackets 20 are welded on the front of the plate 18, and a seat screw 21 passes through each bracket 20 into the seat back 11. The shroud 19 serves, not only as a housing for the mounting of a rear wheel yoke (as will be described hereafter), but also as a brace for the seat back portion 11.

Figure 3:
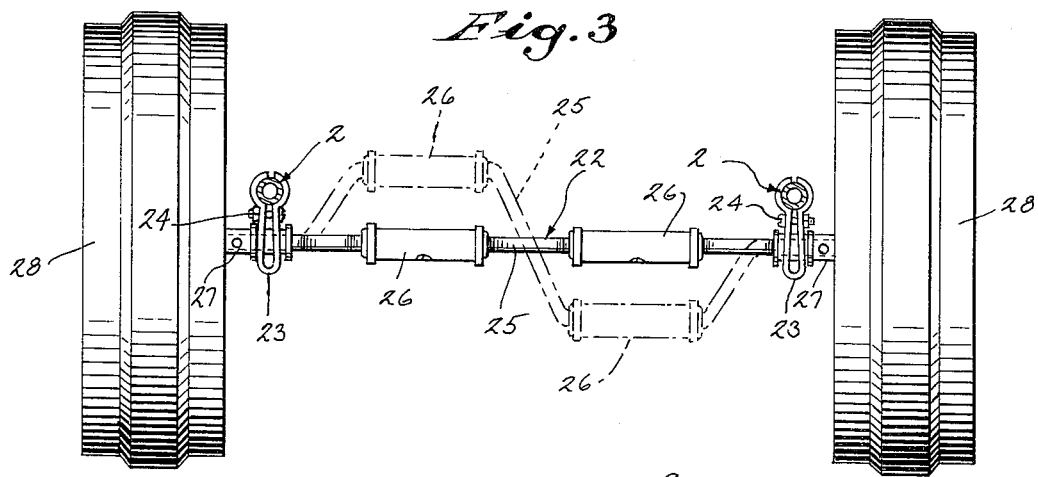
FIG. 3 is a view in cross-section taken along the plane of the line 3—3 shown in FIG. 1.

A rotatable front drive axle 22 is adjustably mounted on the front frame section 2. As shown in FIG. 3, the front drive axle 22 is connected to each longitudinal side member 7 by a spring clamp 23 having a set screw 24. By loosening the set screws 24, the spring clamps 23 can be slid along the longitudinal side members 7 and, thus, the front drive axle 22 can be mounted at various positions along the front frame section 2. As the front drive axle 22 is moved along the front frame section 2, the longitudinal distance between the front drive axle 22 and the operator's seat 9 is modified.

The front drive axle 6 has a central pedal portion 25 mounting a pair of pedals 26 and a wheel receiving portion 27 at each end thereof. When the front drive axle 22 is mounted on the front frame section 2, the pedal portion 25 is disposed between the longitudinal side members 7, and the wheel receiving portions 27 are cantilevered outboard from the longitudinal side members 7. A ground engaging front drive wheel 28 is rotatably mounted on each wheel receiving portion 27. As the pedals 26 are rotated by the user of the vehicle about the axle axis, the front drive wheels 28 are rotated and the vehicle propelled.

The vehicle has a rear wheel steering mechanism which includes a rear wheel castor 29 pivotally mounted on the plate 18. As seen in FIGS. 2 and 5, the rear wheel castor 29 has a bifurcated yoke with a stub shaft 30 extending vertically upwardly from the yoke center portion 31. A pair of yoke tines 32 receive a rear wheel mounting pin 33, and a ground engaging rear steering wheel 34 is rotatably mounted on the pin 33, and this wheel 34 is of small axial extent, as contrasted with the full axial length between the front wheels 28, so that a turning motion can be easily imparted to the steering mechanism.

The rear wheel castor 29 is carried by the mounting plate 18 within the interior of the shroud 19. A rectangular upstanding portion 35 is welded on the upper side of the mounting plate 18, and the stub shaft 30 projects vertically upwardly through the mounting plate 18 and an upper structural part 36 of the upstanding portion 35. A shaft mounting pin 37 passes through the upper end of the stub shaft 30 and secures the stub shaft 30 in place, while permitting pivotal movement of the castor assembly. The shaft mounting member 37 restrains the shaft 30 from vertical downward movement, and a spacer collar 38 interposed between the plate 18 and the yoke center portion 31 inhibits upward vertical movement of the castor assembly. Thus, the rear steering wheel 34 is mounted for pivotal movement about a vertical axis, and when pivoted imparts a turning motion to the vehicle.

To accomplish the multiple aspects of a seat surrounded by a frame, a low center of gravity, and a rear steering wheel of axial length less than frame width, a novel aspect of the invention is the points of connection of the frame with the vehicle wheels, which points comprise a rear connection behind the operator's seat with the pivoted mounting of the rear wheel at a height above the wheel, and front connections at axle height with the front wheels. The frame thus has a line of slope between the connection above the rear wheel and connections with the front wheel axle, which allows the frame to surround the seat when seat cushion level is at about the lowest axle height, but not more than the highest wheel height.

Turning now to the steering mechanism as shown in FIG. 4, a steering lever 39 is pivotally mounted at its mid-section to the exterior of each of the longitudinal side members 7. Each steering lever 39 has an opening 40 at its mid-section through which one of the frame securing bolts 4 extends transversely. Thus, the steering levers 39 are coaxially mounted with one another and with the uprights 15 of the seat mounting strap 14. Each steering lever 39 includes a handle portion 41 which rises above its associated longitudinal side member 7 having a plastic hand grip 42 adhered to its upper end, and a lower arm portion 43 descending beneath its associated longitudinal side member 7. With further reference to FIGS. 2 and 5, a steering control arm 44 is welded on the exterior of each yoke tine 32 and projects sidewardly therefrom. A steering rod 45 connects each steering lever 39 with one of the steering control arms 44. One end of each steering rod 45 is connected to the lower arm portion 43 of one of the steering levers 39, and its other end is connected to one of the steering control arms 44. The steering rods 45 are bent sidewardly and inwardly and extend upwardly and rearwardly beneath the open-centered frame 1 to converge towards the rear wheel castor 29. As the vehicle operator tilts the steering levers 39 in fore and aft directions, the steering rods 45 move backwardly and forwardly, respectively, in response thereto. As a result of this movement of the steering rods 45, the rear wheel castor 29, and thus the rear steering wheel 34 pivots about an upright axis to impart a steering motion to the vehicle.

It should be apparent to those skilled in the art that a number of variations can be made in the above described vehicle without departing from the spirit of the invention. For example, the vehicle can be constructed with any desired dimensions and can be made so that it is suitable for use by adults. Also, drive means other than pedals may be mounted on the front drive axle 22. For instance, a small motor could be operably mounted on the front drive axle 22 to propel the vehicle, thus eliminating the necessity for the operator to expend his own energy in driving the vehicle.

The invention provides a vehicle primarily intended for children which has a low center of gravity to enhance safety of use. This is achieved by placing the operator's seat cushion at a level beneath the tops of the vehicle wheels, at about axle height. The operator is positioned with a substantially upright torso, so as to remain comfortable, and legs are extended for efficient use of the foot pedals. A sports car attitude results for the entire body. A wrap-around frame presents a cockpit area within the vehicle which is protected by the frame. The user does not sit aloft from the vehicle proper, as in common tricycle configurations. Further, steering is accomplished by joy-stick levers at the user's side which are more normal than rotation of a center shaft rising upward from a pivoted front wheel. Hence, the invention provides multiple advantages for a child's vehicle.

I claim:
1. In a vehicle, the combination comprising:
    a frame having a pair of longitudinal side members spaced from one another and front and rear transverse members extending between the side members to form an open center cockpit area, said side members having a downward and forward incline;
    a front axle secured to said frame;
    a pair of spaced front wheels mounted by said front axle that are outboard of said open center cockpit area;
    a mounting member connected to said rear transverse frame member;
    a pivoted rear wheel support connected to said mounting member with a wheel receiving yoke depending from said mounting member;
    rear wheel means mounted by said wheel receiving yoke;
    a seat in said open center cockpit area having (i) a back portion braced on said mounting member which is disposed between and straddled by said frame side members, and (ii) a cushion portion at a height beneath the run of said frame side members that is located between said front axle and said mounting member; and
    steering levers mounted by said frame side members alongside said seat which are connected to said pivoted rear wheel support for steering control thereof.
2. A vehicle as in claim 1, wherein said front axle has pedals inside said open center cockpit area for driving the vehicle, and the cockpit area between said seat and said pedals is unobstructed.
3. A vehicle as in claim 1, wherein said cushion portion of said seat is disposed at an elevation which is beneath the tops of the vehicle wheels.
4. In a vehicle, the combination comprising:
    an open-centered frame;
    an operator's seat mounted on said open-centered frame and disposed within the interior of said open-centered frame;
    a front drive axle mounted for rotation at the front of said open-centered frame which is adjustably mounted on said open-centered frame whereby the distance between said operator's seat and said drive means can be adjusted;
    a rear wheel castor pivotally mounted at the rear of said open-centered frame and having an axial extent which is less than the axial length of said front drive axle;
    a pair of ground engaging front drive wheels, one connected to each end of said front drive axle and disposed on the exterior of said open-centered frame;
    a ground engaging rear steering wheel connected to said rear wheel castor;
    drive means mounted on said front drive axle and disposed within the interior of said open-centered frame between said front drive wheels for rotating said front drive wheels;
    a pair of steering levers, one movably mounted on each side of said open-centered frame; and
    a pair of steering rods, each having one end connected to one of said steering levers and its other end connected to said rear wheel castor to turn said rear steering wheel in response to manual actuation of said steering levers.
5. In a vehicle, the combination comprising:
    an open-centered frame having a pair of longitudinal side members spaced from one another that extend from the front to the rear of the vehicle, and a pair of transverse members, one at the front and the other at the rear, which extend between the longitudinal side members to form therewith a wrap-around frame that forms a vehicle perimeter;
    an axle rotatably mounted toward the front of said open-centered frame with a pedal portion between said longitudinal side members and wheel receiving portions cantilevered outboard from said longitudinal side members;
    a front drive wheel rotatably mounted on each said wheel receiving portion;
    an operator's seat with cushion and back portions located toward the rear of said open-centered frame and between said longitudinal side members, with the cushion portion at an elevation beneath said longitudinal side members and the back portion rising above said longitudinal side members, whereby said seat is disposed within the open-centered frame;

a support member interconnecting the rear of said back portion and said rear transverse frame member;

a rear wheel castor carried by said support member that pivots about an upright axis;

a rear steering wheel rotatably mounted by said rear wheel castor;

a pair of steering control arms extending sideward from each side of said rear wheel castor;

a pair of steering levers each pivoted at its midsection to one of said longitudinal side members with a handle portion rising above its associated side member that moves in a fore and aft direction and a lower arm portion beneath the point of pivot; and a pair of steering rods each connected between the lower arm portion of a steering lever and one of said steering control arms, said rods extending convergent rearward beneath said open-centered frame.

* * * * *